US012693788B2

(12) United States Patent
Dong et al.

(10) Patent No.:   US 12,693,788 B2
(45) Date of Patent:       Jul. 28, 2026

(54) METHOD, DEVICE, AND COMPUTER PROGRAM PRODUCT FOR WEAR LEVELING

(71) Applicant: Dell Products L.P., Round Rock, TX (US)

(72) Inventors: Hailan Dong, Chengdu (CN); Chi Chen, Chengdu (CN); Huijuan Fan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/929,838

(22) Filed: Oct. 29, 2024

(65) Prior Publication Data

US 2025/0335103 A1     Oct. 30, 2025

(30) Foreign Application Priority Data

Apr. 26, 2024     (CN) .......................... 202410517037.5

(51) Int. Cl.
*G06F 12/00*          (2006.01)
*G06F 3/06*           (2006.01)
(52) U.S. Cl.
CPC .......... *G06F 3/0616* (2013.01); *G06F 3/0653* (2013.01); *G06F 3/0659* (2013.01); *G06F 3/0689* (2013.01)
(58) Field of Classification Search
CPC ..... G06F 3/0611; G06F 3/0659; G06F 3/0679
USPC ......................................................... 711/154
See application file for complete search history.

(56) References Cited

U.S. PATENT DOCUMENTS

| | | | |
|---|---|---|---|
| 9,348,761 B1 | 5/2016 | Cummins et al. | |
| 9,811,288 B1 | 11/2017 | Chen et al. | |
| 10,067,840 B1 | 9/2018 | Labaj et al. | |
| 10,082,965 B1 | 9/2018 | Tamilarasan et al. | |
| 10,209,904 B2 | 2/2019 | Himelstein et al. | |
| 11,474,719 B1* | 10/2022 | Sular ..................... | G06F 3/0619 |
| 2011/0004722 A1* | 1/2011 | Jeddeloh ................. | G06F 13/16 |
| | | | 710/33 |
| 2013/0179624 A1 | 7/2013 | Lambert et al. | |
| 2014/0089565 A1* | 3/2014 | Lee ......................... | G06F 3/061 |
| | | | 711/103 |
| 2020/0042224 A1* | 2/2020 | Dalmatov ............. | G06F 3/0644 |
| 2022/0121563 A1 | 4/2022 | Kamran et al. | |

(Continued)

OTHER PUBLICATIONS

Huijuan Fan; "Method, Device, and Program Product for Wear Leveling," U.S. Appl. No. 18/929,859, filed Oct. 29, 2024.

*Primary Examiner* — Mohamed M Gebril
(74) *Attorney, Agent, or Firm* — BainwoodHuang

(57)          ABSTRACT

Techniques are directed to wear leveling. Such techniques involve: determining, at least based on the type information of each redundant array of independent disks (RAID) group in a plurality of RAID groups, the write loss of each of the RAID groups. Such techniques further involve: determining the wear status of each of the RAID groups according to the status information and write loss of each of the RAID groups. Such techniques further involve: transferring at least a portion of data and/or a write task of a first RAID group to a second RAID group based on the write loss and the wear status of each of the RAID groups. With such wear leveling techniques, wear caused by write tasks can be evenly distributed among the RAID groups, so that the degree of wear among the RAID groups is more leveled.

20 Claims, 5 Drawing Sheets

(56)                    References Cited

U.S. PATENT DOCUMENTS

| | | | |
|---|---|---|---|
| 2022/0386214 A1* | 12/2022 | Kim | G01S 5/10 |
| 2022/0414102 A1 | 12/2022 | Shatsky et al. | |
| 2023/0079698 A1* | 3/2023 | Shaharabany | G06F 3/064 |
| | | | 711/154 |
| 2023/0214115 A1 | 7/2023 | Lee et al. | |
| 2023/0342031 A1 | 10/2023 | Dong et al. | |
| 2024/0354015 A1 | 10/2024 | Shatsky et al. | |
| 2025/0335103 A1* | 10/2025 | Dong | G06F 3/0616 |

* cited by examiner

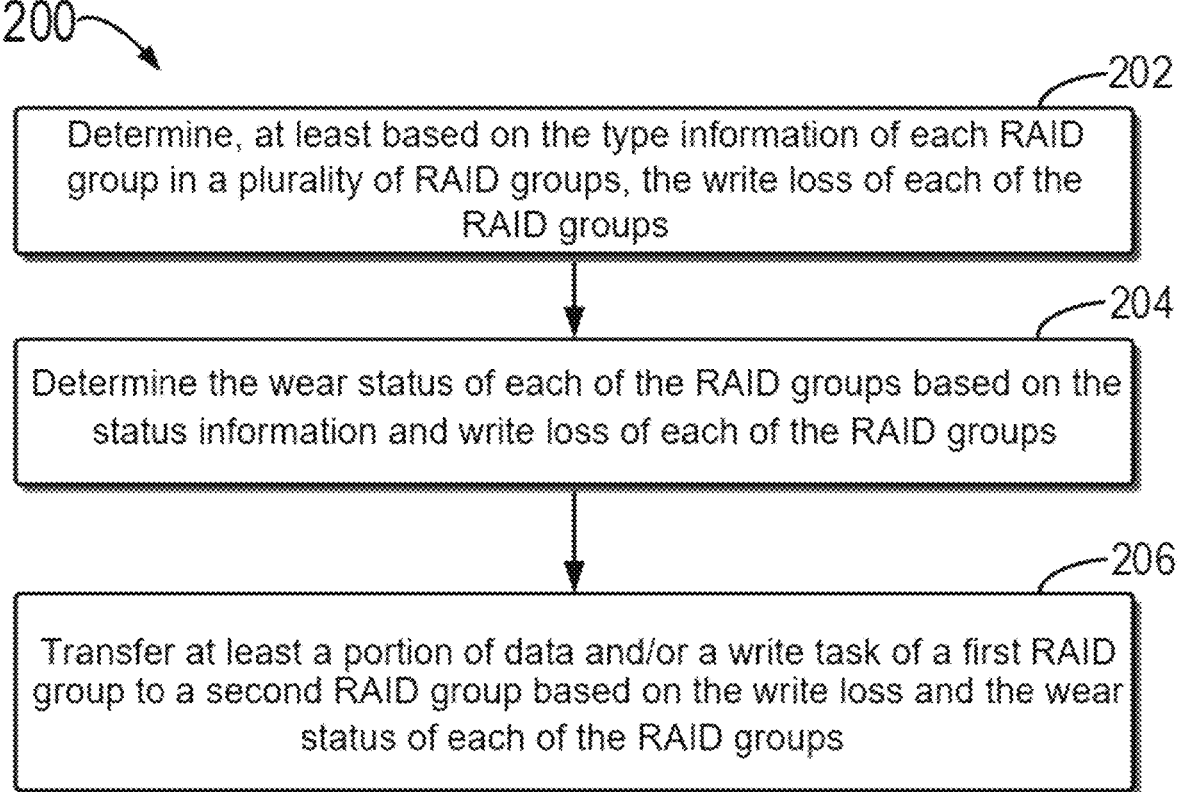

200

202

Determine, at least based on the type information of each RAID group in a plurality of RAID groups, the write loss of each of the RAID groups

204

Determine the wear status of each of the RAID groups based on the status information and write loss of each of the RAID groups

206

Transfer at least a portion of data and/or a write task of a first RAID group to a second RAID group based on the write loss and the wear status of each of the RAID groups

FIG. 2

METHOD, DEVICE, AND COMPUTER PROGRAM PRODUCT FOR WEAR LEVELING

CROSS-REFERENCE TO RELATED APPLICATION

This application claims priority to Chinese Patent Application No. CN202410517037.5, on file at the China National Intellectual Property Administration (CNIPA), having a filing date of Apr. 26, 2024, and having "METHOD, ELECTRICAL DEVICE AND COMPUTER PROGRAM PRODUCT FOR BALANCING WEAR" as a title, the contents and teachings of which are herein incorporated by reference in their entirety.

TECHNICAL FIELD

The present disclosure relates to the field of data storage, and more particularly, relates to a method, device, and computer program product for wear leveling.

BACKGROUND

Redundant array of independent disks (RAID) is a technology that combines a plurality of physical disk drives into one or more logical units. It is designed to improve data access speed and enhance data security and fault tolerance through data redundancy and parallel processing.

RAID technology can be divided into several levels based on different disk array combinations, such as RAID 0, RAID 1, and RAID 5. Each level has its own specific modes of data distribution and redundancy, and thus is applicable to different application scenarios and needs. For example, RAID 0 distributes data across a plurality of disks using striping technology to provide maximum storage performance. RAID 1 provides data redundancy through data mirroring to ensure data reliability. RAID 5 combines striping with distributed parity to improve performance and provide fault tolerance. RAID technology is favored due to its excellent data redundancy and I/O performance enhancement capabilities. However, with the continuous use of storage devices, the problem of physical wear has gradually become prominent, which directly affects the reliability and service life of the storage devices.

SUMMARY OF THE INVENTION

Embodiments of the present disclosure provide a method, device, and computer program product for wear leveling. In a first aspect of the embodiments of the present disclosure, a method for wear leveling is provided. The method includes: determining, at least based on the type information of each redundant array of independent disks (RAID) group in a plurality of RAID groups, the write loss of each of the RAID groups. The method further includes: determining the wear status of each of the RAID groups according to the status information and write loss of each of the RAID groups. The method further includes: transferring at least a portion of data and/or a write task of a first RAID group to a second RAID group based on the write loss and the wear status of each of the RAID groups.

In a second aspect of the embodiments of the present disclosure, an electronic device is provided. The electronic device includes one or more processors; and a storage device configured to store one or more programs that, when executed by the one or more processors, cause the one or more processors to perform actions including: determining, at least based on the type information of each RAID group in a plurality of RAID groups, the write loss of each of the RAID groups. These actions further include: determining the wear status of each of the RAID groups according to the status information and write loss of each of the RAID groups. The actions further include: transferring at least a portion of data and/or a write task of a first RAID group to a second RAID group based on the write loss and the wear status of each of the RAID groups.

In a third aspect of the embodiments of the present disclosure, a computer program product is provided, the computer program product being tangibly stored on a non-volatile computer-readable medium and including machine-executable instructions that, when executed, cause a machine to perform actions including: determining, at least based on the type information of each RAID group in a plurality of RAID groups, the write loss of each of the RAID groups. These actions further include: determining the wear status of each of the RAID groups according to the status information and write loss of each of the RAID groups. The actions further include: transferring at least a portion of data and/or a write task of a first RAID group to a second RAID group based on the write loss and the wear status of each of the RAID groups.

It should be understood that the content described in the Summary of the Invention section is neither intended to limit key or essential features of the embodiments of the present disclosure, nor intended to limit the scope of the present disclosure. Other features of the present disclosure will become readily understood from the following descriptions.

BRIEF DESCRIPTION OF THE DRAWINGS

The above and other features, advantages, and aspects of the embodiments of the present disclosure will become more apparent with reference to the accompanying drawings and the following detailed description. In the accompanying drawings, identical or similar reference numerals represent identical or similar elements, in which:

FIG. 2 is a flow chart of a wear leveling method according to some embodiments of the present disclosure;

DETAILED DESCRIPTION

Figure 1:
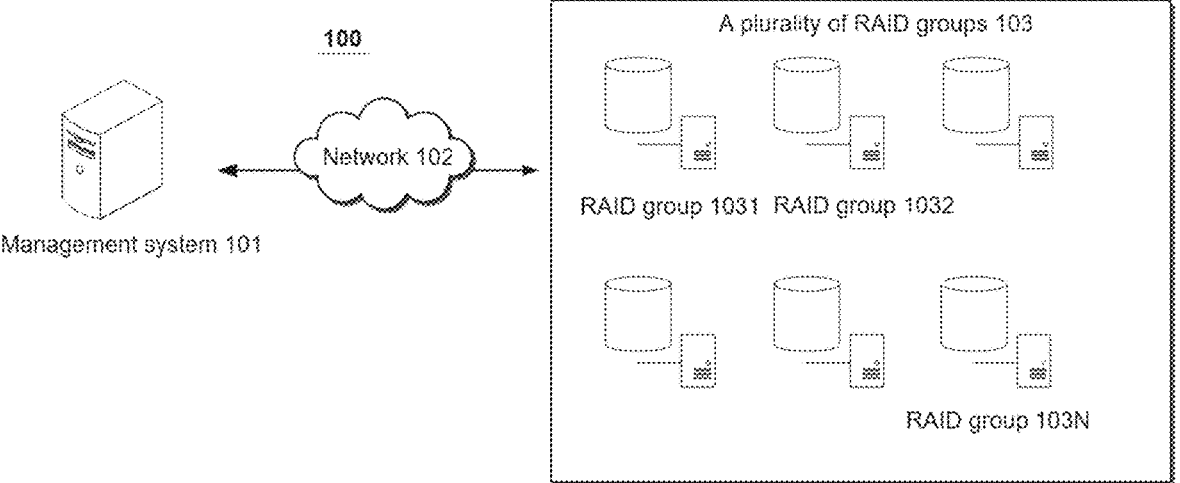
FIG. 1 is a schematic diagram of an example environment in which an embodiment of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described below in further detail with reference to the accompanying drawings. Although the accompanying drawings show some embodiments of the present disclosure, it should be understood that the present disclosure may be implemented in various forms and should not be interpreted as being limited to the embodiments stated herein. Rather, these embodiments are provided for understanding the present disclosure more thoroughly and completely. It should be understood that the accompanying drawings and embodiments of the present disclosure are for illustrative purposes only and are not intended to limit the scope of protection of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or the same objects. Other explicit and implicit definitions may also be included below.

RAID technology combines a plurality of storage devices into a whole, i.e., a RAID set; in a write task, in addition to actual data writing, additional computation and check operations need to be performed to provide redundancy characteristics. These additional operations increase the overhead of the write task, resulting in the generation of write penalties. In the related art, since these write penalties are difficult to quantify, the overheads of write tasks in RAID sets with different attributes are often considered as the same by default, resulting in the degrees of wear of the RAID sets also being considered as the same, so there is no wear leveling solution across the RAID sets. This, in turn, causes those skilled in the art to be unable to distribute the wear evenly across various storage devices during use, and thus each storage device needs to be replaced frequently.

In view of this, the present disclosure provides a method for wear leveling. The method according to embodiments of the present disclosure includes: determining, at least based on the type information of each RAID group in a plurality of RAID groups, the write loss of each of the RAID groups. The method further includes: determining the wear status of each of the RAID groups according to the status information and write loss of each of the RAID groups. The method further includes: transferring at least a portion of data and/or a write task of a first RAID group to a second RAID group based on the write loss and the wear status of each of the RAID groups. With the wear leveling method disclosed by the present disclosure, the true wear of the RAID groups can be accurately estimated by using the write losses caused by different RAID types, and the wear caused by write tasks can be evenly distributed among the RAID groups based on the true wear, so that the degree of wear among the RAID groups is more leveled.

FIG. 1 is a schematic diagram of an example environment 100 in which an embodiment of the present disclosure can be implemented. As shown in FIG. 1, the environment 100 can include a management system 101, a network 102, and a plurality of RAID groups 103, where the management system 101 is communicatively coupled to the plurality of RAID groups 103 through the network 102, and the plurality of RAID groups 103 include RAID groups 1031-103N. The network 102 may be, for example, a wide area network (WAN), a local area network (LAN), a wireless network, a public telephone network, an intranet, and any other type of network well known to those skilled in the art.

In this embodiment, the wear leveling method is performed by the management system 101. A processor and a storage region may be provided in the management system 101 for performing the embodiments of the present disclosure. In this embodiment, the method performed by the management system 101 includes the following steps. The management system 101 determines, at least based on the type information of each of RAID groups 1031-103N in a plurality of RAID groups 103, the write loss of each of the RAID groups 1031-103N. This operation can be performed separately from other operations. For example, this operation can be performed during idle periods to save computing resources during peak periods. The type information of the plurality of RAID groups 103 can be pre-stored in the management system 101, and the type information of the plurality of RAID groups 103 can also be provided by the plurality of RAID groups 103 themselves in real time. In some embodiments, the management system 101 can, after the write losses of the RAID groups 1031-103N are computed and obtained for the first time, organize the write losses into table data and store it locally. In this way, every time the embodiments of the present disclosure are performed, if the type information of the RAID groups 1031-103N does not change, the table data can be directly invoked to determine the write loss of each of the RAID groups 1031-103N, which can improve efficiency and save computing resources.

The management system 101 determines the wear status of each of the RAID groups 1031-103N according to the status information and write loss of each of the RAID groups 1031-103N. The status information indicates the degrees of usage of the RAID groups 1031-103N. Similarly, the management system 101 can require the RAID groups 1031-103N to respectively provide status information and perform pre-estimation before performing other steps to determine the wear statuses of the RAID groups 1031-103N.

The management system 101 transfers at least a portion of data and/or a write task of a first RAID group to a second RAID group based on the write loss and the wear status of each of the RAID groups 1031-103N. For example, the first RAID group may be RAID group 1031, and the second RAID group may be RAID group 1032. After transferring is performed, the portion of the write task for the first RAID group is performed by the second RAID group, so that wear is apportioned between the first and second RAID groups. Each of the RAID groups in the plurality of RAID groups 103 is associated with a plurality of storage devices. These storage devices include, but are not limited to, hard disks (including hard disk drives (HDDs) and solid-state drives (SSDs)), disk arrays of storage systems consisting of a plurality of disks, and external storage devices: e.g., external hard disks and storage arrays.

As shown in FIG. 1, in the environment 100, the network 102 can be utilized to transfer data between the plurality of RAID groups 103 and the management system 101. The network 102 has a theoretical bandwidth. The theoretical bandwidth refers to the maximum transmission speed supported by the network 102, which indicates the maximum data amount that can be transmitted by the network 102 under ideal conditions, typically measured by the number of bits transmitted per second (bps). For example, if the theoretical bandwidth of the network 102 is 100 Mbps, this indicates that it can transmit 100 megabits of data per second under ideal conditions. In fact, however, due to other possible factors in the network (e.g., signal interference, bandwidth sharing, transmission delay, and the like), the actual transmission speed may not reach 100 Mbps.

As understood by persons of ordinary skill in the art, an example of the management system 101 may be a stand-alone physical server, a server cluster or a distributed system composed of a plurality of physical servers, or a cloud server that provides basic cloud computing services such as cloud services, cloud databases, cloud computing, cloud functions, cloud storage, network services, cloud communications, middleware services, domain name services, security services, CDN, and big data and artificial intelligence platforms. The server may be connected directly or indirectly through wired or wireless communication, which is not limited in the present application.

FIG. 2 is a flow chart of a wear leveling method according to some embodiments of the present disclosure. As shown in FIG. 2, a flow chart 200 includes blocks 202-206. At block 202, at least based on the type information of each RAID group in a plurality of RAID groups, the write loss of each of the RAID groups is determined. The write loss (also known as "write penalty") refers to the number of write operations that actually occur after a piece of data is written. As shown above, more than one write operations actually occur due to the existence of check and computation operations, so in order for accurate wear leveling, the write loss caused by the write operations needs to be determined first. The type information of the RAID groups can include RAID 0, RAID 1, RAID 5, RAID 6, RAID 10, etc., because different RAID types have different write losses. For example, for RAID 5, additional read and write operations need to be performed for each write due to the existence of its parity bit, so RAID 5 has a relatively high write loss. Typically, each of the RAID groups is associated with a plurality of storage devices, such as a plurality of solid-state drives (SSDs).

At block 204, the wear status of each of the RAID groups is determined according to the status information and write loss of each of the RAID groups. The status information, for example, can include, but is not limited to, the number of reads/writes, capacity, and temperature of the storage devices, to determine the wear status of each of the RAID groups. The wear status can be determined accurately according to the status information based on the write loss. The status information indicates the degrees of historical usage of the storage devices associated with the RAID group.

At block 206, at least a portion of data and/or a write task of a first RAID group is transferred to a second RAID group based on the write loss and the wear status of each of the RAID groups. The write task is often associated with stored data, so in order to make the write task meaningful, the stored data needs to be transferred to the second RAID group. For example, a data transfer guidance that indicates which data and/or related write tasks of the first RAID group is transferred to the second RAID group can be created first. The data transfer guidance is then performed, for example, transferring data and/or write tasks from a heavily worn RAID group to a less worn RAID group. This operation can include updating data distributions in the RAID groups through data replication, deletion, or other methods, while ensuring data consistency and integrity. With the wear leveling method disclosed by the present disclosure, the true wear of the RAID groups can be accurately estimated by using the write losses caused by different RAID types, and the wear caused by write tasks can be evenly distributed among the RAID groups based on the true wear, so that the degree of wear among the RAID groups is more leveled.

Table 1 shows a table of the distribution of wear degrees of a plurality of RAID groups.

| Identifier | Type information | Number of remaining writes |
|---|---|---|
| Storage device 1 | RAID 2 | 39330 |
| Storage device 2 | RAID 2 | 38267 |
| Storage device 3 | RAID 2 | 37455 |
| Storage device 4 | RAID 5 | 15217 |
| Storage device 5 | RAID 5 | 13012 |
| Storage device 6 | RAID 5 | 14884 |
| . . . | . . . | . . . |

As can been seen from Table 1, for the RAID group consisting of storage devices 1-3, the type information indicates RAID 2, and the number of remaining writes of each storage device is 1900. For the RAID group consisting of storage devices 4-6, the type information indicates RAID 6, and the number of remaining writes of each storage device is 1700. Therefore, the degree of wear of each of the RAID groups is unleveled. At block 206, a portion of data and/or a write task of the RAID group with type RAID 5 can be transferred to the RAID group with type RAID 2, so that a future write operation may occur in the RAID group with type RAID 2. In such a way, the degree of wear is further leveled.

The present disclosure provides some embodiments for each of the blocks in FIG. 2 respectively. For block 202, the embodiments include determining a type weight according to the type information, where the type weight indicates the number of actual write operations that occur while each piece of data is written. The embodiments further include determining the write loss at least based on the type weight. As above, due to the existence of check and computation operations and so on (these information is closely related to attribute information), more than one write operations actually occur. In this embodiment, the number of actual write operations can be accurately determined by quantifying the write losses according to the type information, which provides a basis for wear leveling.

In some embodiments, the way to determine the type weight includes recording the number of actual writes of writing test data in a RAID group of a type indicated by the type information, where the test data includes a plurality of pieces of data. The way to determine the type weight further includes determining the type weight of the RAID group of the type according to the quantity of the test data and the number of actual writes. For example, the number of actual writes can be determined according to Formula (1).

$$WP_j = \frac{a1}{a2}$$

Formula (1)

where j indicates the type information of the RAID group, $WP_j$ indicates the write loss determined according to the type information, a1 indicates the total number of actual writes of writing the test data into the RAID group, and a2 indicates the quantity of the test data. According to Formula (1), the write loss of the RAID group of each type can be accurately computed.

Table 2 shows a correspondence between type information and write losses computed according to Formula (1).

| Type information | Write loss |
|---|---|
| RAID 5 | 2 |
| RAID 6 | 3 |
| RAID 10 | 2 |

In some embodiments, Table 2 can be stored locally and invoked when the write loss is computed. Formula (1) only takes into account the type information, and can also compute the write loss by combining the unit size of the written data. The unit size of written data refers to the unit size that needs to be written every time data is written, which is set by an upstream control subject for the RAID group. In some embodiments, the unit size of the written data is divided by the size of a data block to obtain a block weight. The embodiments further include rounding the block weight as a range weight indicating the number of data blocks involved in each write operation. The embodiments further include determining the write loss according to the type weight and the range wight. For example, the number of data blocks involved in each write operation can be determined according to Formula (2).

$$WP = \frac{s_w}{s_b} \qquad \text{Formula (2)}$$

where WP indicates the number of data blocks involved, $s_b$ indicates the size of a data block, and $s_w$ indicates the unit size of the written data. If WP≤1, WP=1. If WP>1, WP=int(WP)+1, where int is a rounding operation. When the write loss is computed, the computation can be made according to Formula (3), combining Formula (1) and Formula (2).

$$W_r = WP_j * WP = WP_j * \left[ \text{int}\left(\frac{s_w}{s_b}\right) + 1 \right] \qquad \text{Formula (3)}$$

where $W_r$ represents the write loss. According to Formula (3), the write loss can be computed more accurately.

For block 204, in some embodiments, the wear status is computed separately for each of the RAID groups. The embodiments include determining, based on the write loss, the service life of the RAID group according to the cumulative number of writes and the total number of writes of the plurality of storage devices associated with the RAID group. The embodiments further include determining the usage of the RAID group according to the write capacity and total capacity of the plurality of storage devices. The embodiments further include determining the wear status of the RAID group according to the service life and the usage. The cumulative number of writes indicates the number of write operations completed by the storage device and cannot indicate the number of write operations that actually occurred. By introducing the write loss, the number of write operations that actually occurred can be accurately determined. Each storage device usually has a predetermined total number of writes. For example, a solid-state disk can usually be written 100,000 times, and by computing the ratio of the cumulative number of writes to the total number of writes, the wear status of the storage device can be determined in terms of the number of times. The larger the capacity occupancy is, the greater the number of writes. Therefore, the wear status of the storage device can also be determined in terms of capacity occupancy. For example, the service life can be computed according to Formula (4).

$$W_i = \sum_{k=1}^{K} dn_{i,k}/wn_{i,k} * W_r \qquad \text{Formula (4)}$$

where $W_i$ indicates the service life of an i-th RAID group, i indicates the ordinal number of the RAID group, k indicates the ordinal number of the storage device in the i-th RAID group, there are k storage devices associated with the i-th RAID group in total, $dn_{i,k}$ indicates the cumulative number of writes of a k-th storage device in the i-th RAID group, $wn_{i,k}$ indicates the total number of writes of the k-th storage device in the i-th RAID group, and $W_r$ indicates the write loss. In another example, the usage is computed according to Formula (5).

$$C_i = \sum_{k=1}^{K} dc_{i,k}/tc_{i,k} \qquad \text{Formula (5)}$$

where i indicates the ordinal number of the RAID group, $C_i$ indicates the usage of the i-th RAID group, k indicates the ordinal number of the storage device in the i-th RAID group, there are k storage devices associated with the i-th RAID group in total, $dc_{i,k}$ indicates the write capacity of the k-th storage device in the i-th RAID group, and $tc_{i,k}$ indicates the total capacity of the k-th storage device in the i-th RAID group. Further, Formulas (4)-(5) can be combined, and the wear status can be computed according to Formula (6).

$$WS_i = \omega_w \cdot W_i + \omega_c \cdot C_i \qquad \text{Formula (6)}$$

where $WS_i$ indicates the wear status of the i-th RAID group, $\omega_w$ indicates a first weight, and $\omega_c$ indicates a second weight. Formula (6) provides a solution to accurately quantify the wear status of the RAID group.

In some embodiments, wear leveling is achieved according to the global wear status of the RAID group. The embodiments include determining a global wear status according to each wear status. The embodiments further include detecting whether the global wear status meets a leveling condition. The embodiments further include, in response to the global wear status meeting the leveling condition, transferring at least a portion of data and/or a write task of the first RAID group to the second RAID group based on the write loss and the wear status of each of the RAID groups. In the embodiments, by taking a leveling condition as a trigger, the wear leveling operation is automatically initiated when all the wear is unleveled. For the global wear status, in some embodiments, an average wear status is determined according to the wear status of each of the RAID groups. The embodiments further include determining a wear standard deviation according to the wear status of each of the RAID groups and the average wear status. The embodiments further include determining global wear leveling according to the wear standard deviation and the average wear status. The global wear status indicates an overall estimate of the wear statuses of the plurality of RAID groups. For example, the average wear status can be computed according to Formula (7).

$$WS_{average} = \frac{\sum_{i=1}^{N} WS_i}{N}$$   Formula (7)

where $WS_{average}$ indicates the average wear status, N indicates the number of the RAID groups, and $WS_i$ indicates the wear status of the i-th RAID group. In another example, the wear standard deviation can be computed according to Formula (8).

$$\sigma = \sqrt{\frac{\sum_{i=1}^{N} (WS_i - WS_{average})^2}{N}}$$   Formula (8)

where $\sigma$ indicates the wear standard deviation, N indicates the number of the RAID groups, $WS_i$ indicates the wear status of the i-th RAID group, and $WS_{average}$ indicates the average wear status. In one example, the global wear status can be computed according to Formula (9).

$$\lambda = \frac{\sigma}{WS_{average}} = \frac{\sqrt{\frac{\sum_{i=1}^{N} (WS_i - WS_{average})^2}{N}}}{WS_{average}}$$   Formula (9)

where $\lambda$ indicates the global wear status, $\sigma$ indicates the wear standard deviation, $WS_{average}$ indicates the average wear status, $WS_i$ indicates the wear status of the i-th RAID group, and N indicates the number of the RAID groups. According to Formula (9), the global wear status which can indicate global wear deviation situations can be accurately determined. In some alternative embodiments, for the global wear status, the difference between the wear status of the first RAID group and the wear status of the second RAID group is determined as the global wear status. This can reduce the polarization of individual RAID groups.

In some embodiments, each of the RAID groups includes a plurality of relocation units, each relocation unit is associated with a data block set, each relocation unit records the number of writes, and based on the write loss and the wear status of each of the RAID groups, an operation of transferring a portion of data includes determining the write popularity of each relocation unit in the first RAID group according to the write loss of the first RAID group and the number of historical writes of each relocation unit. The operation of transferring a portion of data further includes determining a relocation unit with a maximum write popularity as a source relocation unit. The operation of transferring a portion of data further includes determining the write popularity of each relocation unit of the second RAID group according to the write loss of the second RAID group and the number of writes of each relocation unit. The operation of transferring a portion of data further includes determining the relocation unit with the minimum write popularity as a destination relocation unit. The operation of transferring a portion of data further includes transferring data and/or a write task of the source relocation unit to the destination relocation unit. In some embodiments, the product of the write loss of the first RAID group and the number of writes of each relocation unit is taken as the write popularity of each relocation unit. For example, the write popularity of each relocation unit can be computed according to Formula (10).

$$t_{i,m} = W_{i,m} * W_r = W_{i,m} * WP_j * \left[ int\left(\frac{s_w}{s_b}\right) + 1 \right]$$   Formula (10)

where $t_{i,m}$ indicates the write popularity of a m-th relocation unit in the i-th RAID group, $W_r$ indicates the write loss, $W_{i,m}$ indicates the number of writes, $WP_j$ indicates the write loss determined by the type information, int indicates a rounding operation, $s_b$ indicates the size of a data block, and $s_w$ indicates the unit size of the written data. According to Formula (10), the data and/or write task of the relocation unit with the maximum write popularity can be transferred to the relocation unit of other less worn RAID groups, so the wear leveling among the RAID groups can be achieved very finely.

Figure 3:
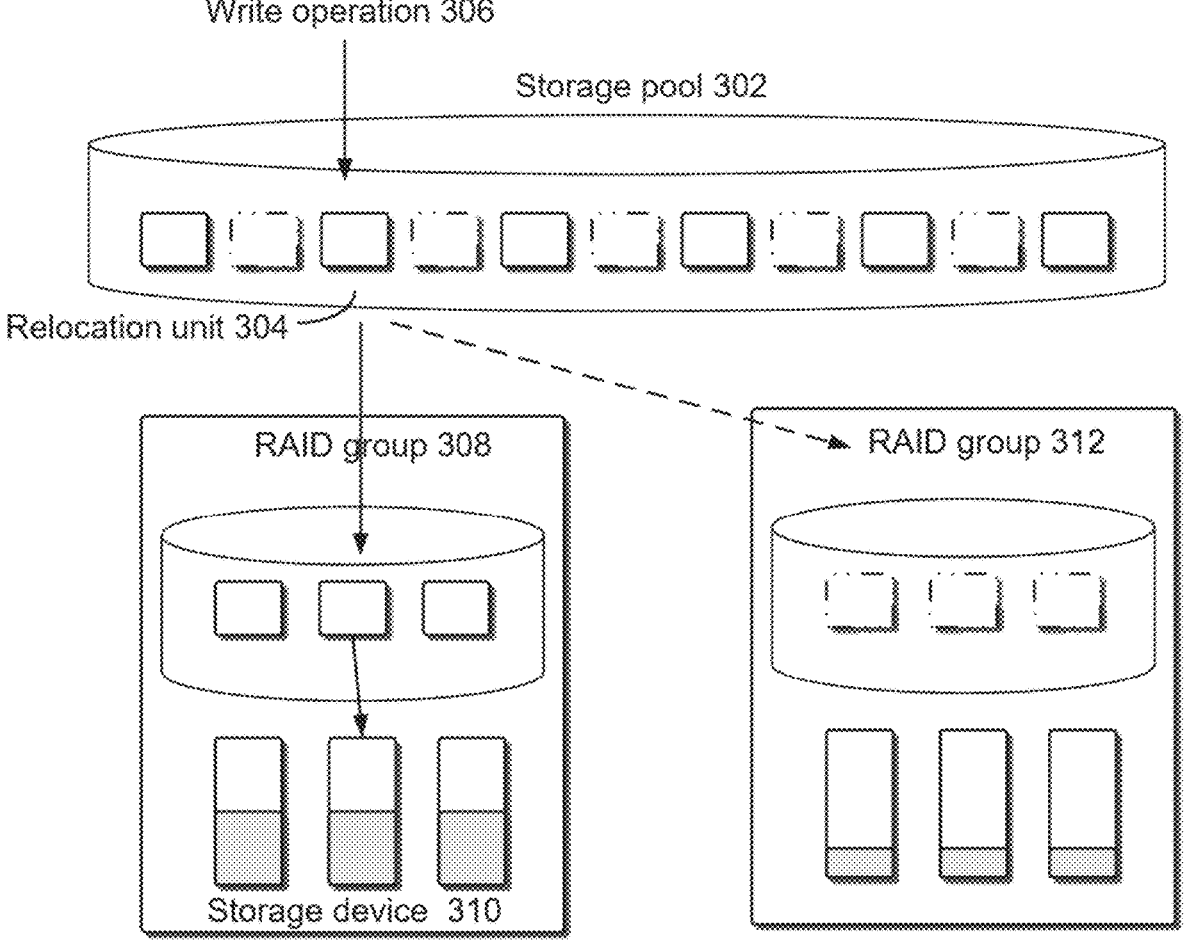
FIG. 3 is a diagram showing an effect of wear leveling according to embodiments of the present disclosure.

FIG. 3 is a diagram showing an effect of wear leveling according to embodiments of the present disclosure. As shown in FIG. 3, the relocation units of each of the RAID groups are placed into a storage pool 302. Before transferring is performed, in a write operation 306 for a relocation unit 304, data should be written in RAID group 308 including the relocation unit 304, the type information of RAID group 308 indicates RAID 5, and the unit size of written data is 8 KB. The write operation 306 is finally written to a data block of a storage device 310 of RAID group 308. The size of the data block of the storage device associated with the RAID group 308 is 2 KB. Therefore, four data blocks are involved for one write to the storage device. As can be seen from Table 2, the write loss caused by RAID 5 is 2. Therefore, it can be determined that actual wear caused by the write operation 306 to RAID group 308 is equivalent to the wear caused by 2×4=8 write operations. After the transferring is performed, the write operation 306 will perform writing for a RAID group 312, as indicated by a dashed arrow. This wear of the write operation 306 will be transferred to RAID group 312.

Figure 4:
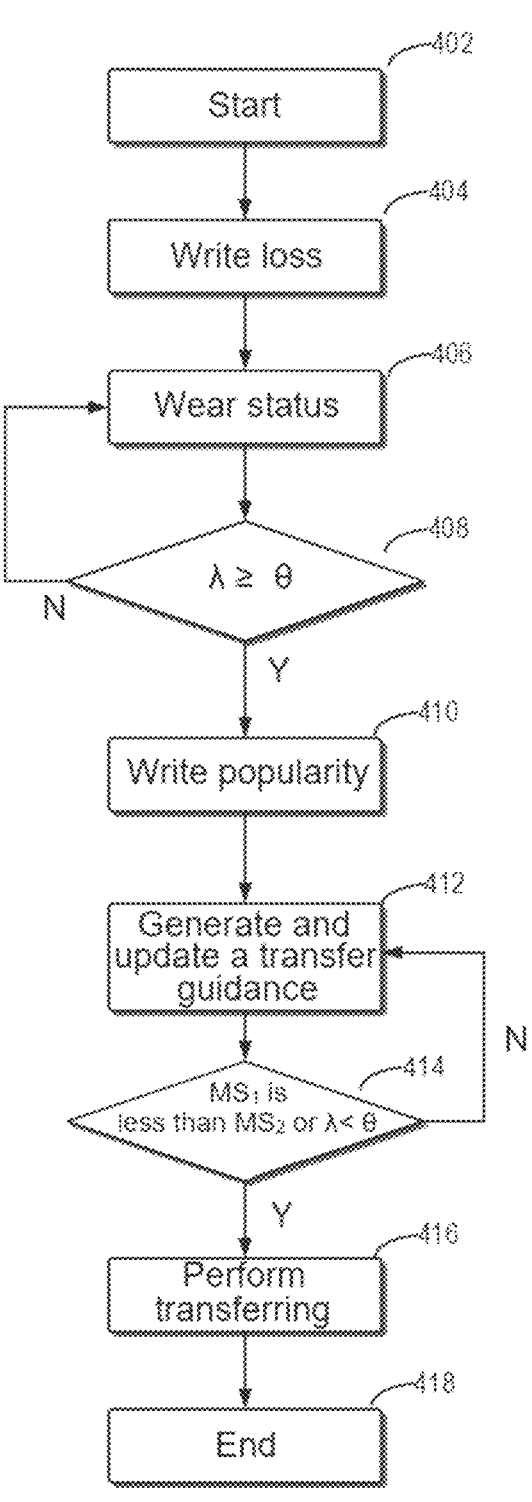
FIG. 4 is a schematic diagram of wear leveling according to an embodiment of the present disclosure.

FIG. 4 is a schematic diagram of wear leveling according to an embodiment of the present disclosure. It starts at block 402. At block 404, at least based on the type information of each RAID group in a plurality of RAID groups, the write loss of each of the RAID groups is computed. In this embodiment, the write loss can be computed according to Formulas (1)-(3). According to Formula (1), a type weight, i.e., the number of actual write operations that occur while each piece of data is written, is determined first. Then, the write loss based on the type information is determined according to the type weight. In addition, the write losses based on the type information can be obtained directly according to the type information by referring to Table 2. Also, the write loss can be computed in combination with the unit size of the written data. According to Formula (2), the unit size of the written data is divided by the size of the data block to obtain a block weight, and the block weight is rounded as a range weight. The write loss based on the unit size of the written data is determined according to the type weight and the range wight. Finally, according to Formula (3), the first two are combined to obtain the write loss.

At block 406, the wear status of each of the RAID groups is computed, and a global wear status is computed at block 406. The wear status of each of the RAID groups can be computed according to Formulas (4)-(6). On one hand, according to Formula (4), based on the write loss, the service life of the RAID group is determined according to the cumulative number of writes and the total number of writes of the plurality of storage devices associated with the RAID group. On the other hand, according to Formula (5), the usage of the RAID group is determined according to the write capacity and total capacity of the plurality of storage devices. Finally, according to Formula (6), the wear status of the RAID group is determined according to the service life and the usage. For the global wear status, based on Formula (7), a wear standard deviation is determined according to the wear status of each of the RAID groups and the average wear status. According to Formula (8), global wear leveling is then determined according to the wear standard deviation and the average wear status. The global wear status can also be computed according to Formula (9).

At block 408, it is determined whether the global wear status meets a leveling condition; in embodiments, this is the size relationship between the global wear status $\lambda$ and a wear threshold $\theta$. If $\lambda \leq \theta$, a transferring operation starts at block 410; otherwise, an operation of returning to block 406 to update the wear status is performed. At block 410, the most heavily worn RAID group is selected as the first RAID group, and the most lightly worn RAID group is selected as the second RAID group. Further, at block 410, the write popularities of the plurality of relocation units of the heavily worn first RAID group are computed. For example, the write popularity of each relocation unit can be computed according to Formula (10). At block 412, one or more relocation units with high write popularities are selected from the plurality of relocation units in the first RAID group and are added to a transfer guidance to generate a transfer guidance.

At block 414, it is determined whether the wear status of the first RAID group is less than or equal to that of the second RAID group when the transferring operation is performed according to the transfer guidance. If so, the transferring operation is valid, and transferring is performed according to the transfer guidance at block 416; otherwise, an operation of returning to block 412 to update the transfer guidance needs to be performed. The method of updating the transfer guidance is to continue selecting the relocation unit with a high write popularity from the relocation units of the first RAID group and adding the selected relocation unit to the transfer guidance. At block 414, it may be determined whether $\lambda$ is less than or equal to $\theta$. If $\lambda < \theta$, the transferring operation is valid and transferring is performed at block 416 according to the transfer guidance; otherwise, an operation of returning to block 412 to update the transfer guidance in the foregoing manner needs to be performed. After it is determined that the transferring operation based on the transfer guidance is valid at block 414, the method proceeds to block 416 to perform transferring, that is, transferring the data and/or write tasks of one or more relocation units to another RAID group according to the transfer guidance. Finally, the method ends at block 418.

Figure 5:
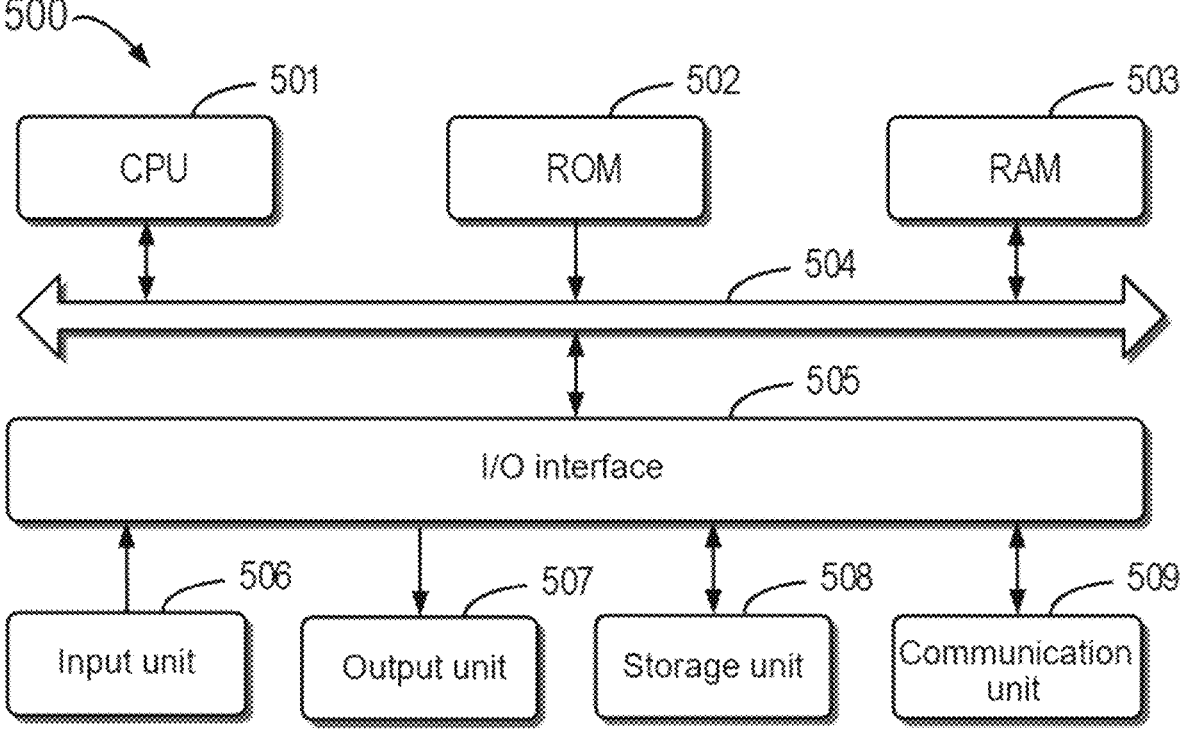
FIG. 5 is a schematic block diagram of an example device that can be used to implement embodiments of the present disclosure.

FIG. 5 is a schematic block diagram of an example device 500 that may be used to implement embodiments of the present disclosure. As shown in the figure, the device 500 includes a computing unit 501 that may execute various appropriate actions and processing according to computer program instructions stored in a read-only memory (ROM) 502 or computer program instructions loaded from a storage unit 508 onto a random access memory (RAM) 503. Various programs and data required for the operation of the device 500 may further be stored in the RAM 503. The computing unit 501, the ROM 502, and the RAM 503 are connected to each other through a bus 504. An input/output (I/O) interface 505 is also connected to the bus 504.

A plurality of components in the device 500 are connected to the I/O interface 505, including: an input unit 506, such as a keyboard and a mouse; an output unit 507, such as various types of displays and speakers; the storage unit 508, such as a disk and an optical disc; a communication unit 509, such as a network card, a modem, and a wireless communication transceiver. The communication unit 509 allows the device 500 to exchange information/data with other devices via a computer network, such as the Internet, and/or various telecommunication networks.

The computing unit 501 may be various general-purpose and/or special-purpose processing components with processing and computing capabilities. Some examples of the computing unit 501 include, but are not limited to, central processing units (CPUs), graphics processing units (GPUS), various specialized artificial intelligence (AI) computing chips, various computing units for running machine learning model algorithms, digital signal processors (DSPs), and any appropriate processors, controllers, microcontrollers, etc. The computation unit 501 executes various methods and processes described above, such as method 200. For example, in some embodiments, method 200 may be implemented as a computer software program that is tangibly included in a machine-readable medium such as the storage unit 508. In some embodiments, some or all of the computer program may be loaded and/or installed onto the device 500 via the ROM 502 and/or the communication unit 509. When the computer program is loaded to the RAM 503 and executed by the computing unit 501, one or more steps of method 200 described above may be performed. Alternatively, in other embodiments, the computing unit 501 may be configured to implement method 200 in any other suitable manner (such as by means of firmware).

The functions described herein above may be executed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

Program codes for implementing the methods of the present disclosure may be written by using one programming language or any combination of multiple programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof. Additionally, although operations are depicted in a particular order, it should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of network, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or other programmable data processing apparatus to produce a machine, such that these instructions, when executed by the processing unit of the computer or other programmable data processing apparatus, produce means (e.g., specialized circuitry) for implementing the functions/acts specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored thereon includes an article of manufacture that includes instructions that implement various aspects of the functions/actions specified in one or more blocks in the flow charts and/or block diagrams.

The computer-readable program instructions may also be loaded onto a computer, other programmable data processing apparatus, or other device, such that a series of operations or steps are performed on the computer, other programmable data processing apparatus, or other device to produce a computer-implemented process, such that the instructions executed on the computer, other programmable data processing apparatus, or other device implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed essentially in parallel, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method for wear leveling, comprising:

determining, at least based on type information of each RAID group in a plurality of RAID groups, write loss of each of the RAID groups;

determining wear status of each of the RAID groups according to status information and the write loss of each of the RAID groups; and transferring at least a portion of data and/or a write task of a first RAID group to a second RAID group based on the write loss and the wear status of each of the RAID groups;

wherein transferring at least the portion of data and/or the write task of the first RAID group to the second RAID group comprises:

determining a global wear status according to the wear status of each of the RAID groups;

detecting whether the global wear status meets a leveling condition; and in response to the global wear status meeting the leveling condition, transferring at least the portion of data and/or the write task of the first RAID group to the second RAID group based on the write loss and the wear status of each of the RAID groups.

2. The method according to claim 1, wherein determining, at least based on the type information of each RAID group in the plurality of RAID groups, the write loss of each of the RAID groups comprises:

determining a type weight according to the type information, wherein the type weight indicates a number of actual write operations that occur while test data is written; and determining the write loss at least based on the type weight.

3. The method according to claim 2, wherein determining the type weight according to the type information comprises:

recording the number of actual write operations that occur while the test data is written, wherein the test data comprises a plurality of pieces of data; and determining the type weight according to a quantity of the test data and the number of actual writes.

4. The method according to claim 2, wherein determining the write loss at least based on the type weight comprises:

dividing a unit size of the written test data by a size of a data block to obtain a block weight;

rounding the block weight to an integer to indicate a number of data blocks involved in each write operation, the integer being considered a range weight; and determining the write loss according to the type weight and the range weight.

5. The method according to claim 1, wherein each of the RAID groups is associated with a plurality of storage devices, and determining the wear status of each of the RAID groups according to the status information and the write loss of each of the RAID groups comprises:

performing on each of the RAID groups:

determining, based on the write loss, a service life of the RAID group according to a cumulative number of writes and a total number of writes of the plurality of storage devices associated with the RAID group;

determining usage of the RAID group according to write capacity and total capacity of the plurality of storage devices; and determining the wear status of the RAID group according to the service life and the usage.

6. The method according to claim 1, wherein determining a global wear status according to each wear status comprises:

determining an average wear status according to the wear status of each of the RAID groups;

determining a wear standard deviation according to the wear status of each of the RAID groups and the average wear status; and determining the global wear leveling according to the wear standard deviation and the average wear status.

7. The method according to claim 1, wherein determining a global wear status according to each wear status comprises:

determining the difference between the wear status of the first RAID group and the wear status of the second RAID group as the global wear status.

8. The method according to claim 1, wherein each of the RAID groups comprises a plurality of relocation units, each relocation unit is associated with a data block set, each relocation unit records the number of writes, and transferring at least the portion of data and/or the write task of the first RAID group to the second RAID group comprises:

determining a write popularity of each relocation unit of the first RAID group according to a write loss of the first RAID group and a number of historical writes of each relocation unit of the first RAID group;

determining a relocation unit with a maximum write popularity as a source relocation unit;

determining a write popularity of each relocation unit of the second RAID group according to a write loss of the second RAID group and a number of writes of each relocation unit of the second RAID group;

determining a relocation unit with a minimum write popularity as a destination relocation unit; and transferring data and/or a write task of a source relocation unit to a destination relocation unit.

9. The method according to claim 8, wherein determining the write popularity of each relocation unit of the first RAID group comprises:

taking a product of the write loss of the first RAID group and the number of writes of each relocation unit of the first RAID group as the write popularity of each relocation unit of the first RAID group.

10. An electronic device, comprising:

at least one processor; and memory coupled to the at least one processor and having instructions stored thereon, wherein the instructions, when executed by the at least one processor, cause the electronic device to perform actions comprising:

determining, at least based on type information of each RAID group in a plurality of RAID groups, write loss of each of the RAID groups;

determining wear status of each of the RAID groups according to status information and the write loss of each of the RAID groups; and transferring at least a portion of data and/or a write task of a first RAID group to a second RAID group based on the write loss and the wear status of each of the RAID groups;

wherein transferring at least a portion of data and/or a write task of a first RAID group to a second RAID group comprises:

determining a global wear status according to each wear status;

detecting whether the global wear status meets a leveling condition; and in response to the global wear status meeting the leveling condition, transferring at least a portion of data and/or a write task of the first RAID group to the second RAID group based on the write loss and the wear status of each of the RAID groups.

11. The electronic device according to claim 10, wherein determining, at least based on the type information of each RAID group in the plurality of RAID groups, the write loss of each of the RAID groups comprises:

determining a type weight according to the type information, wherein the type weight indicates a number of actual write operations that occur while test data is written; and determining the write loss at least based on the type weight.

12. The electronic device according to claim 11, wherein determining the type weight according to the type information comprises:

recording the number of actual write operations that occur while the test data is written, wherein the test data comprises a plurality of pieces of data; and determining the type weight according to a quantity of the test data and the number of actual writes.

13. The electronic device according to claim 11, wherein determining the write loss at least based on the type weight comprises:

dividing a unit size of the written test data by a size of a data block to obtain a block weight;

rounding the block weight to an integer to indicate a number of data blocks involved in each write operation, the integer being considered a range weight; and determining the write loss according to the type weight and the range weight.

14. The electronic device according to claim 10, wherein each of the RAID groups is associated with a plurality of storage devices, and determining the wear status of each of the RAID groups according to the status information and the write loss of each of the RAID groups comprises:

performing on each of the RAID groups:

determining, based on the write loss, a service life of the RAID group according to a cumulative number of writes and a total number of writes of the plurality of storage devices associated with the RAID group;

determining usage of the RAID group according to write capacity and total capacity of the plurality of storage devices; and determining the wear status of the RAID group according to the service life and the usage.

15. The electronic device according to claim 10, wherein determining a global wear status according to each wear status comprises:

determining an average wear status according to the wear status of each of the RAID groups;

determining a wear standard deviation according to the wear status of each of the RAID groups and the average wear status; and determining the global wear leveling according to the wear standard deviation and the average wear status.

16. The electronic device according to claim 10, wherein determining a global wear status according to each wear status comprises:

determining the difference between the wear status of the first RAID group and the wear status of the second RAID group as the global wear status.

17. The electronic device according to claim 10, wherein each of the RAID groups comprises a plurality of relocation units, each relocation unit is associated with a data block set, each relocation unit records the number of writes, and transferring at least the portion of data and/or the write task of the first RAID group to the second RAID group comprises:

determining a write popularity of each relocation unit of the first RAID group according to a write loss of the first RAID group and a number of historical writes of each relocation unit of the first RAID group;

determining a relocation unit with a maximum write popularity as a source relocation unit;

determining a write popularity of each relocation unit of the second RAID group according to a write loss of the second RAID group and a number of writes of each relocation unit of the first RAID group;

determining a relocation unit with a minimum write popularity as a destination relocation unit; and transferring data and/or a write task of a source relocation unit to a destination relocation unit.

18. A computer program product having a non-transitory computer readable medium which stores a set of instructions to perform wear leveling; the set of instructions, when carried out by computerized circuitry, causing the computerized circuitry to perform a method of:

determining, at least based on type information of each RAID group in a plurality of RAID groups, write loss of each of the RAID groups;

determining wear status of each of the RAID groups according to status information and the write loss of each of the RAID groups; and transferring at least a portion of data and/or a write task of a first RAID group to a second RAID group based on the write loss and the wear status of each of the RAID groups;

wherein transferring at least a portion of data and/or a write task of a first RAID group to a second RAID group comprises:

determining a global wear status according to the wear status of each of the RAID groups;

detecting whether the global wear status meets a leveling condition; and in response to the global wear status meeting the leveling condition, transferring at least a portion of data and/or a write task of the first RAID group to the second RAID group based on the write loss and the wear status of each of the RAID groups.

19. The computer program product according to claim 18, wherein determining a global wear status according to each wear status comprises:

determining an average wear status according to the wear status of each of the RAID groups;

determining a wear standard deviation according to the wear status of each of the RAID groups and the average wear status; and determining the global wear leveling according to the wear standard deviation and the average wear status.

20. The computer program product according to claim 18, wherein determining a global wear status according to each wear status comprises:

determining the difference between the wear status of the first RAID group and the wear status of the second RAID group as the global wear status.

* * * * *